United States Patent
Kamensky

(10) Patent No.: US 9,641,970 B2
(45) Date of Patent: May 2, 2017

(54) CONCEPTS FOR DETERMINING ATTRIBUTES OF A POPULATION OF MOBILE DEVICE USERS

(71) Applicant: William Kamensky, Columbus, GA (US)

(72) Inventor: William Kamensky, Columbus, GA (US)

(73) Assignee: William Kamensky, Columbus, GA (US)

( * ) Notice: Subject to any disclaimer, the term of this patent is extended or adjusted under 35 U.S.C. 154(b) by 0 days.

(21) Appl. No.: 15/009,024

(22) Filed: Jan. 28, 2016

(65) Prior Publication Data

US 2016/0219398 A1    Jul. 28, 2016

Related U.S. Application Data

(60) Provisional application No. 62/108,593, filed on Jan. 28, 2015.

(51) Int. Cl.
| | |
|---|---|
| *H04W 24/00* | (2009.01) |
| *H04W 4/02* | (2009.01) |
| *G06Q 30/02* | (2012.01) |
| *H04W 4/20* | (2009.01) |

(52) U.S. Cl.
CPC .............. *H04W 4/02* (2013.01); *G06Q 30/02* (2013.01); *G06Q 30/0203* (2013.01); *H04W 4/028* (2013.01); *H04W 4/20* (2013.01)

(58) Field of Classification Search
CPC .... H04W 64/00; H04W 4/02; H04L 29/08657
USPC .......... 455/456.2, 456.1, 414.1, 414.2, 404.2
See application file for complete search history.

(56) References Cited

U.S. PATENT DOCUMENTS

| | | |
|---|---|---|
| 7,092,964 B1 | 8/2006 | Dougherty et al. |
| 8,095,412 B1 | 1/2012 | Zias et al. |
| 8,332,259 B1 | 12/2012 | Zias et al. |

(Continued)

FOREIGN PATENT DOCUMENTS

WO    WO 2006/095329 A1    9/2006

OTHER PUBLICATIONS

International Searching Authority, International Search Report and Written Opinion for International Application No. PCT/US2016/015430, Apr. 15, 2016, 14 pages, European Patent Office, The Netherlands.

*Primary Examiner* — Nghi H Ly
(74) *Attorney, Agent, or Firm* — Alston & Bird LLP

(57) ABSTRACT

Various embodiments are directed to systems and methods for obtaining and analyzing mobile device user attribute data. In various embodiments, a central server is configured to generate inquiry data configured to cause a mobile device to request user input from a user of the mobile device and to compile user attribute data into response data to be provided to the central server. The central server may then transmit the inquiry data to an interface system configured to communicate the inquiry data to the one or more mobile devices. The central server may be additionally configured to receive the response data generated by the mobile devices, either directly from the mobile devices and/or from the interface system. The central server may then analyze the receive response data to determine a population density of mobile device users based on the response data.

20 Claims, 8 Drawing Sheets

(56) References Cited

U.S. PATENT DOCUMENTS

| | | | |
|---|---|---|---|
| 8,566,911 B2* | 10/2013 | Tu | G06F 21/42 |
| | | | 455/411 |
| 8,799,004 B2 | 8/2014 | Bishop, III et al. | |
| 2003/0109265 A1* | 6/2003 | Yamamoto | G01S 5/02 |
| | | | 455/456.1 |
| 2004/0253966 A1* | 12/2004 | Lin | H04W 4/02 |
| | | | 455/456.5 |
| 2007/0142060 A1 | 6/2007 | Moton et al. | |
| 2010/0161506 A1 | 6/2010 | Bosenick et al. | |
| 2011/0082746 A1 | 4/2011 | Rice et al. | |
| 2011/0137808 A1 | 6/2011 | Meyer et al. | |
| 2012/0066026 A1 | 3/2012 | Dusig et al. | |
| 2012/0072263 A1 | 3/2012 | Dusig et al. | |
| 2012/0072288 A1 | 3/2012 | Dusig et al. | |
| 2012/0271706 A1 | 10/2012 | Ransom et al. | |
| 2013/0179221 A1 | 7/2013 | Xamonthene | |
| 2013/0332234 A1 | 12/2013 | Kuppusamy | |
| 2013/0332235 A1 | 12/2013 | Kuppusamy | |
| 2013/0332236 A1 | 12/2013 | Kuppusamy | |
| 2014/0032271 A1 | 1/2014 | Nordstrand | |
| 2014/0100914 A1 | 4/2014 | Cober et al. | |
| 2014/0236669 A1 | 8/2014 | Milton et al. | |

* cited by examiner

*Restaurant functionality for Restaurant Specials System*

CONCEPTS FOR DETERMINING ATTRIBUTES OF A POPULATION OF MOBILE DEVICE USERS

CROSS-REFERENCE TO RELATED APPLICATIONS

This patent application claims priority to Provisional Patent Application No. 62/108,593, filed Jan. 28, 2015, and entitled "Concepts for Determining a Geographical Location of a Sub-Population," which is incorporated herein by reference in its entirety.

BACKGROUND

Successful product and service marketing often utilize personalized advertisements based on a potential consumer's location. Moreover, certain products and/or services may only be offered to consumers within a particular area, and therefore advertising such a product or service to individuals located outside of the limited marketing area is ineffective and may be a waste of company resources.

However, particularly for those products and services available in several marketing regions, companies are often required to expend significant resources in identifying the most effective marketing techniques for each marketing region. Companies often rely on marketing surveys and focus groups including small groups of individuals selected to represent each of various marketing regions in order to aid these companies in identifying the most effective marketing concepts to utilize in each marketing region. Because these marketing surveys and focus groups often utilize a small sample population to represent a particular marketing region, the information gleaned from these marketing tools may not be representative of the population as a whole in a particular marketing region. Additionally, the initial identification of each marketing region requires experts to define the boundaries of marketing regions based on additional market research generally based on other small sample populations.

Similar problems arise for regional and/or local companies seeking to expand their business to new marketing areas. In identifying potential new markets, companies may utilize similar market surveys and focus groups in order to determine the level of interest in a particular product and/or service in various areas. However, in studying the viability of company expansion to various areas, the company must first determine a plurality of areas in which the company may be interested in expanding. In making such a determination, companies may inadvertently overlook viable regions for expansion because information regarding these regions may be unavailable to the company.

Historically, companies have attempted to expand the amount of marketing research information available by utilizing widely distributed surveys, and by rewarding individuals who respond to these surveys with product samples, discount coupons, gift cards, and/or the like. These surveys are often distributed via mail or email to individuals on one or more mailing lists assembled by the company or by a third party entity. However, such surveys traditionally have a low response rate, and therefore companies may not obtain information indicative of a population in a region from these surveys.

Therefore, a need exists for systems and methods for obtaining market research information from a plurality of potential consumers, and for identifying each potential consumer's location such that location-specific market research information may be determined.

BRIEF SUMMARY

Various embodiments are directed to a computer-implemented method for obtaining data indicative of attributes of mobile device users. In various embodiments, the method comprising steps for: generating inquiry data at a central server, wherein the inquiry data is configured to cause a mobile device to request user input from a user of the mobile device and to compile user attribute data into response data and wherein the user attribute data comprises data indicative of the user input and data stored locally on the mobile device; transmitting the inquiry data to an interface system, wherein the interface system is configured to communicate with one or more mobile devices and to transmit the inquiry data to one or more mobile devices; and receiving, via the central server, response data generated by one or more mobile devices, wherein the response data is received from the interface system.

Moreover, in various embodiments, the inquiry data is configured to generate a prompt requesting the user input on a mobile device, and is configured to compile the user attribute data after receipt of user input in response to the prompt. In various embodiments, the inquiry data comprises an executable portion to be stored on a mobile device, and wherein the executable portion is configured to initiate in response to receipt of user input in response to the prompt. In certain embodiments, the attribute data comprises the location of the mobile device at the time a user provides the requested user input, and wherein the inquiry data is configured to cause the mobile device to determine the location of the mobile device and to store data indicative of the location of the mobile device as a portion of the attribute data. In various embodiments, the response data received via the central server comprises the response data generated by one or more mobile devices and supplemental data provided by the interface system. In certain embodiments, the interface system is configured to remotely manage one or more software programs operated by one or more mobile devices, and wherein the interface system is configured to transmit the inquiry data to the one or more mobile devices having the one or more software programs stored thereon. Moreover, in various embodiments, the interface system is configured to transmit the inquiry data to the one or more mobile devices in response to a trigger event. In certain embodiments, the trigger event is selected from: activation of a software program stored on the mobile device, the occurrence of a time, or a determination that the mobile device is located within a defined geographical area. Moreover, in various embodiments the method further comprising steps for analyzing the response data generated by the one or more mobile devices to determine a population density of mobile device users based at least in part on a portion of the response data.

Certain embodiments are directed to a computer-implemented method for obtaining data indicative of attributes of mobile device users. In various embodiments, the method comprising steps for: generating inquiry data at a central server; transmitting the inquiry data to one or more mobile devices, wherein the inquiry data is configured to cause each mobile device to request user input from a user, to determine the location of the mobile device upon receipt of user input, and to compile response data comprising data indicative of the user input, data indicative of the determined location of the mobile device, and data indicative of mobile device attribute data; and receiving response data generated by the one or more mobile devices.

In various embodiments, the method further comprises steps for analyzing the response data generated by the one or more mobile devices to determine a population density of mobile device users based at least in part on a portion of the response data. Moreover, transmitting the inquiry data may comprise transmitting the inquiry data in response to a trigger event. In various embodiments, the inquiry data is configured to generate a prompt requesting the user input on a mobile device, and to compile the user attribute data after receipt of user input in response to the prompt. Moreover, the inquiry data may comprise an executable portion to be stored on a mobile device, and wherein the executable portion is configured to initiate in response to receipt of user input in response to the prompt.

Various embodiments are directed to a system for obtaining data indicative of attributes of mobile device users. In various embodiments, the system comprises one or more memory storage areas; and one or more central computer processors. The one or more central computer processors may collectively be configured to: generate inquiry data, wherein the inquiry data is configured to cause a mobile device to request user input from a user of the mobile device and to compile user attribute data into response data and wherein the user attribute data comprises data indicative of the user input and data stored locally on the mobile device; transmit the inquiry data to an interface system, wherein the interface system is configured to communicate with one or more mobile devices and to transmit the inquiry data to one or more mobile devices; and receive response data generated by one or more mobile devices, wherein the response data is received from the interface system.

In various embodiments, the processors are further configured to analyze the response data generated by the one or more mobile devices to determine a population density of mobile device users based at least in part on a portion of the response data. Moreover, the inquiry data may be configured to generate a prompt requesting the user input on a mobile device, and to compile the user attribute data after receipt of user input in response to the prompt. The inquiry data may additionally comprise an executable portion to be stored on a mobile device, and wherein the executable portion is configured to initiate in response to receipt of user input in response to the prompt. Moreover, in various embodiments, the system may further comprise an interface system. The interface system may comprise one or more interface memory storage areas and one or more interface computer processors. The one or more interface computer processors may be configured to: receive the inquiry data transmitted from the central computer processors; transmit the inquiry data to the one or more mobile devices; receive the response data generated by the one or more mobile devices; and transmit the response data to the central computer processors. Moreover, in various embodiments, the one or more interface computer processors are additionally configured to modify the response data to include supplemental data generated by the one or more interface computer processors prior to transmitting the response data to the central computer processors.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
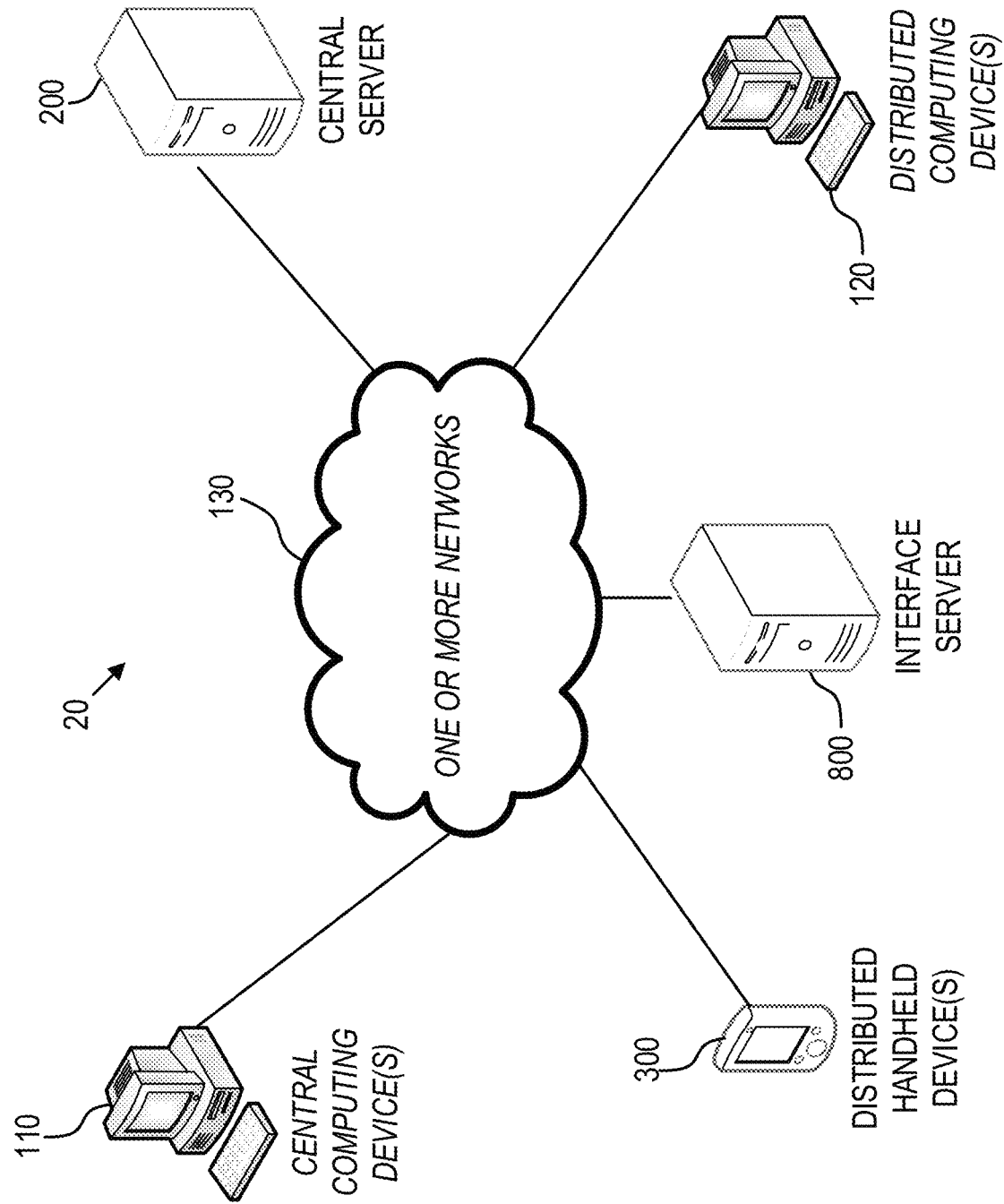
FIG. 1 is a block diagram of a system according to various embodiments.

The present invention will now be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. Like numbers refer to like elements throughout.

Overview

Various embodiments are directed to systems and methods for obtaining user attribute data from various mobile device users, for example, to provide a population analysis of various users. For example various embodiments of the present invention are directed to market research tools, such as systems and methods for determining a user location and one or more user attributes, and associating the determined location with data indicative of the one or more user attributes. The one or more user attributes may be indicative of a user response given to an inquiry sent to the user's device (e.g., distributed computer device and/or mobile device) and/or additional information corresponding to the user (e.g., the user's age, gender, type of device, and/or the like). These inquiries may be provided to the user device via a push notification, such that the inquiry is presented to the user without any necessary user input to request the inquiry.

Inquiries may be sent from a central server either directly or indirectly to a plurality of user devices (e.g., distributed computer devices and/or mobile devices) in response to a trigger event, such as the occurrence of a particular time (e.g., 5:00 PM), the opening of a computer program installed on a user device, the entry of the user device (e.g., a mobile device) into a particular defined geographical area, and/or the like. The inquiry may comprise a question, such as a multiple choice question having two or more response options, and may be presented to a user of the user device via a pop-up style visual display. For example, an inquiry having two possible responses may be presented to a user upon the user starting a program installed on the user device. In various embodiments, the user may be required to provide a response to the inquiry in order to proceed to use the program initially requested. The user may also be given an option to proceed to utilize the program without providing a response to the inquiry. In various embodiments, the inquiry does not include a question, and various options for response are associated with various graphically displayed objects on the user device, such that a user selecting one of these graphically displayed objects operates to select the response choice associated with the selected object.

After the user provides a response (e.g., selects a response option) to the inquiry, response data indicative of the response may be transmitted to a central server (e.g., directly between the mobile device and the central server and/or indirectly between the mobile device, the interface server and the central server). The transmitted response data may be associated with location data indicative of the location of the user device when the user provided a response to the inquiry, such that a response location may be determined for each response provided by a user. In various embodiments, the transmitted response data may be associated with other identifier data associated with the user and/or the user device. For example, the identifier data may be indicative of the type of device, the gender of the primary user of the device, a service provider associated with the device, and/or the like. Response location data comprising the response data, the location data, and/or the identifier data may be received by a central server (e.g., directly and/or indirectly) and stored in one or more databases. Such response location data may be transmitted from a plurality of user devices, such that response location data indicative of the response and location of a plurality of device users (e.g., mobile device users) may be stored.

In various embodiments, the inquiry may be generated at the central server by compiling inquiry data indicative of the type of data to be requested, the trigger event, and/or the like. The inquiry may then be transmitted to an interface server (e.g., via an Application Program Interface; "API") managing a computer program to be utilized to distribute the inquiry. The interface server may then transmit the interface server to a plurality of mobile devices (e.g., in response to a trigger event). The mobile device may then compile the requested data (or a portion of the requested data) in response to receipt of the inquiry, and may transmit the requested data to the interface server. The interface server may then provide the requested data to the central server (e.g., via an API) for analysis. Accordingly, the inquiry may be generated by a first entity (e.g., associated with the central server) and distributed via existing distribution channels associated with the interface server (e.g., the interface server may distribute the inquiry to all current users of a smartphone mobile software program). In various embodiments, the central server and the interface server may be separate computing entities, for example, controlled by separate entities (e.g., separate companies). However, in various embodiments, features of the central server and the interface server may be integrated into a single connected computing device controlled by a single entity. In various embodiments, the inquiry may be generated by the central server and distributed to mobile devices via a plurality of interface servers. Thus, the central server may be configured to compile and analyze inquiry response data from users associated with a plurality of interface servers (e.g., users of a plurality of different software programs).

In various embodiments, the central server or another computing device may be configured to generate population density data indicative of a number of inquiry responses of a particular type being provided in a particular unit of area. As a non-limiting example, an inquiry may be provided to a user asking the user "are you a fan of the Yellow Plum?" and providing three possible answers: (1) "Yes," (2) "No," and (3) "Prefer not to answer." Upon receipt of a plurality of answers to the inquiry from a plurality of users, a population density may be determined for those users answering the inquiry by a providing a "Yes" response. For example, one or more population densities within a defined distance away from a particular location or within a defined geographical area may be determined based on the response location data, and displayed via a display device. For example, each of a plurality of population densities determined to have different characteristics (e.g., a different number of users providing a particular response to an inquiry) may be displayed on display device using different colors, shades, and/or the like. As a specific example, a first population density in a first geographical area may be shown in a red color, and a second population density in a second geographical area may be shown in a blue color. In various embodiments, the plurality of geographical areas may be adjacent one another (e.g., such that a blue geographical area is adjacent a red geographical area), spaced some distance apart (e.g., such that a blue geographical area is spaced some distance away from a red geographical area such that the blue geographical area does not share a border with a red geographical area), and/or the like.

Exemplary Apparatuses, Methods, Systems, Computer Program Products, & Computing Entities Embodiments of the present invention may be implemented in various ways, including as computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory VRAM, cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Various embodiments are described below with reference to block diagrams and flowchart illustrations of apparatuses, methods, systems, and computer program products. It should be understood that each block of any of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, could be implemented by special purpose hardware-based computer systems that perform the specified functions or operations, or combinations of special purpose hardware and computer instructions.

Exemplary Architecture of System 20

FIG. 1 is a block diagram of an inquiry response system 20 that can be used in conjunction with various embodiments of the present invention. In at least the illustrated embodiment, the system 20 may include one or more central computing devices 110, one or more distributed computing devices 120, and one or more distributed handheld or mobile devices 300, all configured in communication with a central server 200 and/or an interface server 800 via one or more networks 130. While FIG. 1 illustrates the various system entities as separate, standalone entities, the various embodiments are not limited to this particular architecture.

According to various embodiments of the present invention, the one or more networks 130 may be capable of supporting communication in accordance with any of a number of second-generation (2G), 2.5G, third-generation (3G), and/or fourth-generation (4G) mobile communication protocols, or the like. More particularly, the one or more networks 130 may be capable of supporting communication in accordance with 2G wireless communication protocols IS-136 (TDMA), GSM, and IS-95 (CDMA). Also, for example, the one or more networks 130 may be capable of supporting communication in accordance with 2.5G wireless communication protocols GPRS, Enhanced Data GSM Environment (EDGE), or the like. In addition, for example, the one or more networks 130 may be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones). As yet another example, each of the components of the system 20 may be configured to communicate with one another in accordance with techniques such as, for example, radio frequency (RF), Bluetooth™, infrared (IrDA), or any of a number of different wired or wireless networking techniques, including a wired or wireless Personal Area Network ("PAN"), Local Area Network ("LAN"), Metropolitan Area Network ("MAN"), Wide Area Network ("WAN"), or the like.

Although the device(s) 110-300, 800 are illustrated in FIG. 1 as communicating with one another over the same network 130, these devices may likewise communicate over multiple, separate networks.

According to one embodiment, in addition to receiving data from the servers 200, 800, the distributed devices 110, 120, and/or 300 may be further configured to collect and transmit data on their own. In various embodiments, the devices 110, 120, and/or 300 may be capable of receiving data via one or more input units or devices, such as a keypad, touchpad, barcode scanner, radio frequency identification (RFID) reader, interface card (e.g., modem, etc.) or receiver. The devices 110, 120, and/or 300 may further be capable of storing data to one or more volatile or non-volatile memory modules, and outputting the data via one or more output units or devices, for example, by displaying data to the user operating the device, or by transmitting data, for example over the one or more networks 130.

Exemplary Central Server 200

In various embodiments, the central server 200 includes various systems for performing one or more functions in accordance with various embodiments of the present invention, including those more particularly shown and described herein. It should be understood, however, that the central server 200 might include a variety of alternative devices for performing one or more like functions, without departing from the spirit and scope of the present invention. For example, at least a portion of the central server 200, in certain embodiments, may be located on one or more distributed device(s) 110, 120, and/or one or more handheld or mobile device(s) 300, as may be desirable for particular applications. As will be described in further detail below, in at least one embodiment, the handheld or mobile device(s) 300 may contain one or more mobile applications 330 which may be configured so as to provide a user interface for communication with the central server 200 either directly and/or indirectly (e.g., via the interface server 800), all as will be likewise described in further detail below.

Figure 2:
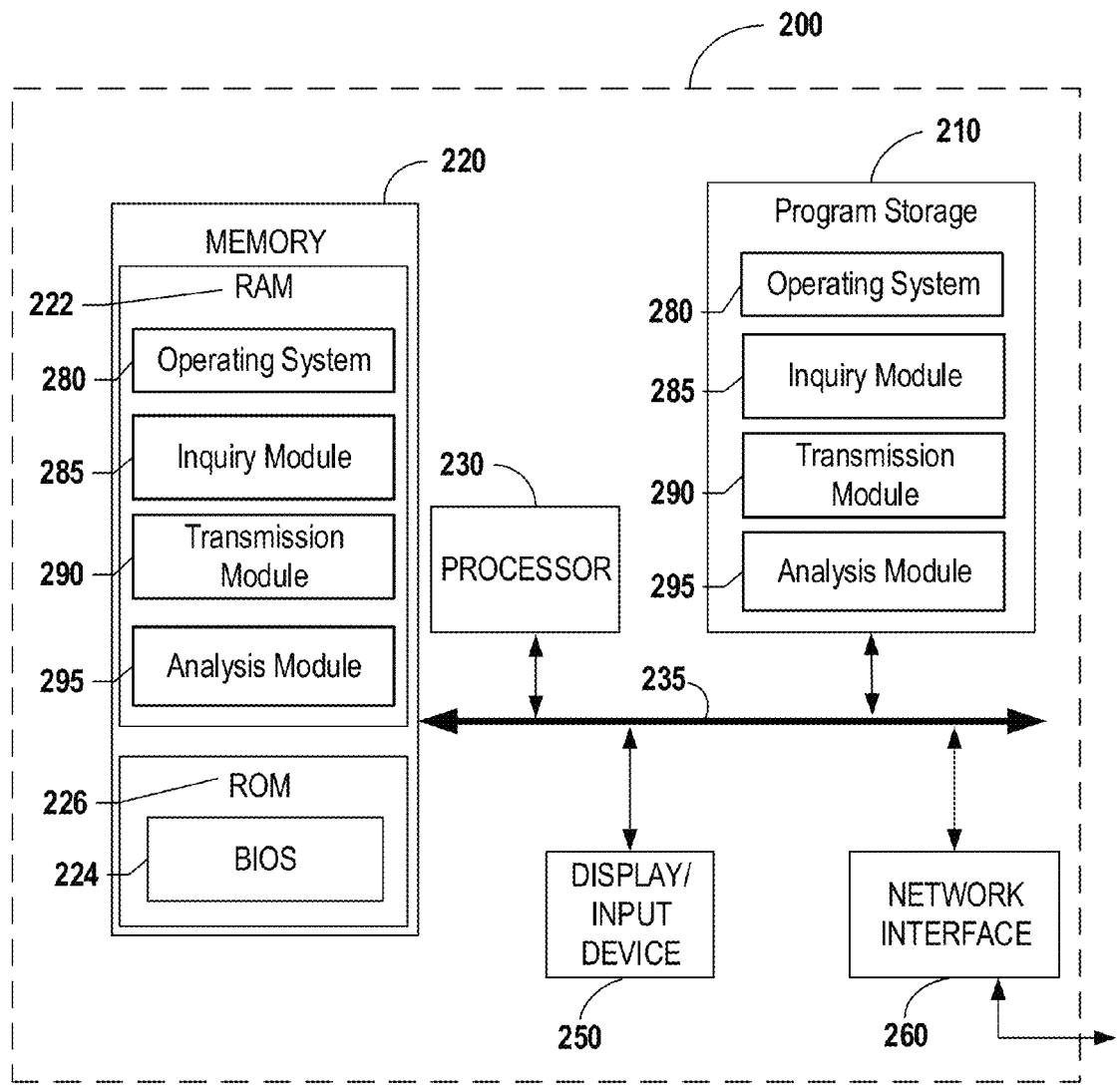
FIG. 2 is a schematic block diagram of a central server according to various embodiments.

FIG. 2 is a schematic diagram of the central server 200 according to various embodiments. The central server 200 includes a processor 230 that communicates with other elements within the central server via a system interface or bus 235. Also included in the central server 200 is a display/input device 250 for receiving and displaying data. This display/input device 250 may be, for example, a keyboard or pointing device that is used in combination with a monitor. The central server 200 further includes memory 220, which preferably includes both read only memory (ROM) 226 and random access memory (RAM) 222. The central server's ROM 226 is used to store a basic input/output system 224 (BIOS), containing the basic routines that help to transfer information between elements within the central server 200. Various ROM and RAM configurations have been previously described herein.

In addition, the central server 200 includes at least one storage device or program storage 210, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 210 are connected to the system bus 235 by an appropriate interface. The storage devices 210 and their associated computer-readable media provide nonvolatile storage for a personal computer. As will be appreciated by one of ordinary skill in the art, the computer-readable media described above could be replaced by any other type of computer-readable media known in the art. Such media include, for example, magnetic cassettes, flash memory cards, digital video disks, and Bernoulli cartridges.

Although not shown, according to an embodiment, the storage device 210 and/or memory of the central server 200 may further provide the functions of a data storage device, which may store historical and/or current delivery data and delivery conditions that may be accessed by the central server 200. In this regard, the storage device 210 may comprise one or more databases. The term "database" refers to a structured collection of records or data that is stored in a computer system, such as via a relational database, hierarchical database, or network database and as such, should not be construed in a limiting fashion.

A number of program modules 285, 290, 295 comprising, for example, one or more computer-readable program code portions executable by the processor 230, may be stored by the various storage devices 210 and within RAM 222. Such program modules may also include an operating system 280. In these and other embodiments, the various modules 285, 290, 295 control certain aspects of the operation of the central server 200 with the assistance of the processor 230 and operating system 280. For example, an Inquiry Module 285 may be configured to generate inquiries to be sent to a plurality of mobile devices 300 and displayed to potential consumers; a Transmission Module 290 may be configured to format inquiry data to comply with an API of the interface server 800 and/or to transmit the plurality of inquiries to each of the plurality of mobile devices 300; and an Analysis Module 295 may be configured to identify a response given to the inquiry by a potential consumer, to associate the response with a location of the potential consumer, and to determine the number of potential consumers in a particular area giving a particular response. In still other embodiments, it should be understood that one or more additional and/or alternative modules may also be provided, without departing from the scope and nature of the present invention.

In various embodiments, the program modules 285, 290, 295 are executed by the central server 200 and are configured to generate one or more graphical user interfaces, reports, instructions, and/or notifications/alerts, all accessible and/or transmittable (either directly and/or indirectly) to various users of the system 20. In certain embodiments, the user interfaces, reports, instructions, and/or notifications/alerts may be accessible via one or more networks 130, which may include the Internet or other feasible communications network, as previously discussed.

In various embodiments, it should also be understood that one or more of the modules 285, 290, 295 may be alternatively and/or additionally (e.g., in duplicate) stored locally on one or more of the devices 110, 120, 140, 300 and/or 800 and may be executed by one or more processors of the same. According to various embodiments, the modules 285, 290, 295 may send data to, receive data from, and utilize data contained in one or more databases, which may be comprised of one or more separate, linked and/or networked databases.

Also located within the central server 200 is a network interface 260 for interfacing and communicating with other elements of the one or more networks 130. It will be appreciated by one of ordinary skill in the art that one or more of the central server 200 components may be located geographically remotely from other central server components. Furthermore, one or more of the central server 200 components may be combined, and/or additional components performing functions described herein may also be included in the central server. In various embodiments, the central server 200 may be configured to communicate with various other entities of the system 20 (e.g., the interface server 800) via one or more APIs configured to enable data transfer between the various entities while ensuring that the data received and transmitted is compatible with each of the involved entities.

While the foregoing describes a single processor 230, as one of ordinary skill in the art will recognize, the central server 200 may comprise multiple processors operating in conjunction with one another to perform the functionality described herein. In addition to the memory 220, the processor 230 can also be connected to at least one interface or other means for displaying, transmitting and/or receiving data, content or the like. In this regard, the interface(s) can include at least one communication interface or other means for transmitting and/or receiving data, content or the like, as well as at least one user interface that can include a display and/or a user input interface, as will be described in further detail below. The user input interface, in turn, can comprise any of a number of devices allowing the entity to receive data from a user, such as a keypad, a touch display, a joystick or other input device.

Still further, while reference is made to the "central server" 200, as one of ordinary skill in the art will recognize, embodiments of the present invention are not limited to traditionally defined server architectures. Still further, the system of embodiments of the present invention is not limited to a single server, or similar network entity or mainframe computer system. Other similar architectures including one or more network entities operating in conjunction with one another to provide the functionality described herein may likewise be used without departing from the spirit and scope of embodiments of the present invention. For example, a mesh network of two or more personal computers (PCs), similar electronic devices, or handheld portable devices, collaborating with one another to provide the functionality described herein in association with the server 200 may likewise be used without departing from the spirit and scope of embodiments of the present invention.

According to various embodiments, many individual steps of a process may or may not be carried out utilizing the computer systems and/or servers described herein, and the degree of computer implementation may vary, as may be desirable and/or beneficial for one or more particular applications.

Interface Server 800

In various embodiments, the interface server 800 may have a configuration similar to that described above in reference to the central server 200. In various embodiments, the interface server 800 may comprise components similar to that described above, including one or more processors, memory storage areas, and a network interface permitting the interface server 800 to communicate with the various entities of the system 20. In various embodiments, the memory may comprise an executable module configured to transmit data (e.g., inquiries, notifications, and/or the like) to various computing entities, such as the central server 200, mobile devices 300, and/or distributed handheld devices 120. For example, the memory may comprise an executable notification module configured to provide inquiries to the various mobile devices 300 and/or distributed computing devices 120 and to receive response data therefrom. As previously noted, the interface server 800 may be configured to store data received from the various mobile devices 300, central server 200, and/or distributed computing devices 120 in one or more databases in communication with the interface server 800, and/or to transmit at least a portion of the data to the central server 200.

In various embodiments, the interface server 800 may be configured to manage or otherwise receive and transmit data relating to one or more software programs installed and/or provided to various mobile devices 300 and/or distributed computing devices 120. Such software programs may not themselves incorporate an inquiry functionality as described herein, but may operate as a platform through which inquiries may be provided between the central server 200, the interface server 800, and the various mobile devices 300 and/or distributed computing devices 120.

Distributed Handheld (or Mobile) Device(s) 300

Figure 3:
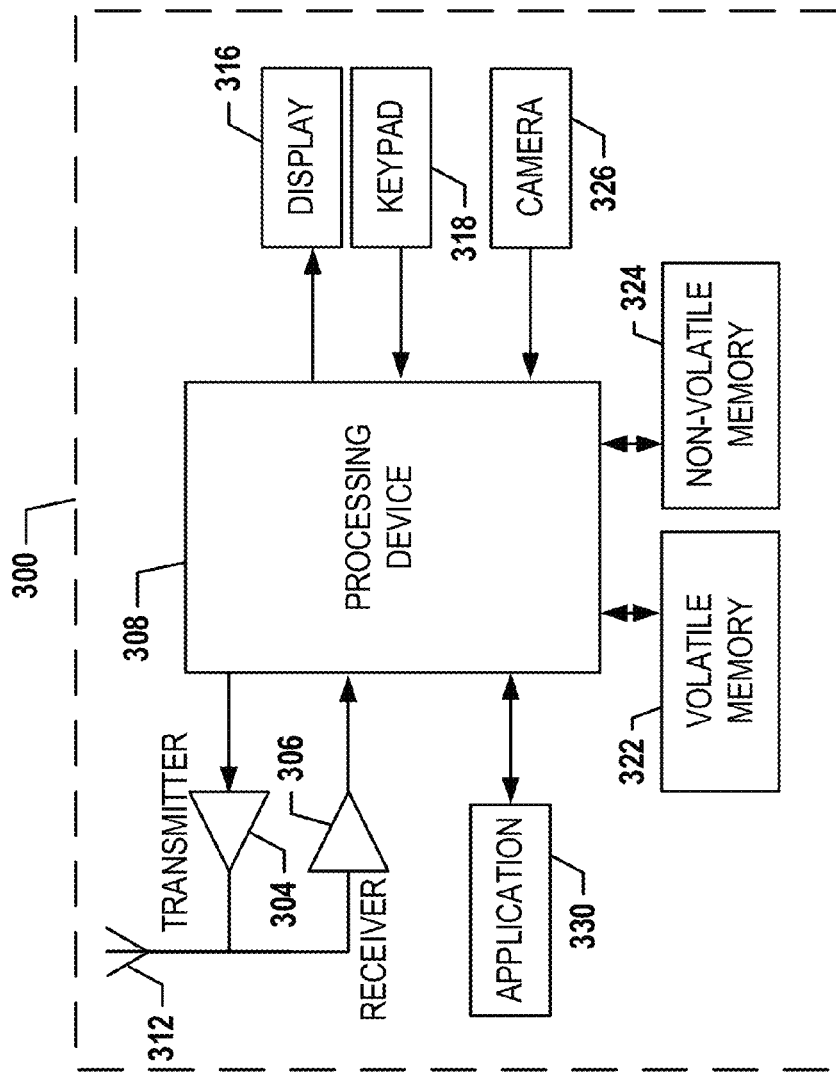
FIG. 3 is a schematic block diagram of an exemplary mobile device according to various embodiments.

FIG. 3 provides an illustrative schematic diagram representative of a mobile device 300 that can be used in conjunction with various embodiments of the present invention. Mobile devices 300 can be operated by various parties. As shown in FIG. 3, a mobile device 300 may include an antenna 312, a transmitter 304 (e.g., radio), a receiver 306 (e.g., radio), and a processing element 308 that provides signals to and receives signals from the transmitter 304 and receiver 306, respectively.

The signals provided to and received from the transmitter 304 and the receiver 306, respectively, may include signaling data in accordance with an air interface standard of applicable wireless systems to communicate with various entities, such as the central server 200, the interface server 800, the distributed devices 110, 120, 140 and/or the like. In this regard, the mobile device 300 may be capable of operating with one or more air interface standards, communication protocols, modulation types, and access types. More particularly, the mobile device 300 may operate in accordance with any of a number of wireless communication standards and protocols. In a particular embodiment, the mobile device 300 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the mobile device 300 may according to various embodiments communicate with various other entities using concepts such as Unstructured Supplementary Service data (USSD), Short Message Service (SMS), Multimedia Messaging Service (MMS), Dual-Tone Multi-Frequency Signaling (DTMF), and/or Subscriber Identity Module Dialer (SIM dialer). The mobile device 300 can also download changes, add-ons, and updates, for instance, to its firmware, software (e.g., including executable instructions, applications, program modules), and operating system.

According to one embodiment, the mobile device 300 may include a location determining device and/or functionality. For example, the mobile device 300 may include a GPS module adapted to acquire, for example, latitude, longitude, altitude, geocode, course, and/or speed data. In one embodiment, the GPS module acquires data, sometimes known as ephemeris data, by identifying the number of satellites in view and the relative positions of those satellites.

The mobile device 300 may also comprise a user interface (that can include a display 316 coupled to a processing element 308) and/or a user input interface (coupled to a processing element 308). The user input interface can comprise any of a number of devices allowing the mobile device 300 to receive data, such as a keypad 318 (hard or soft), a touch display, voice or motion interfaces, or other input device. In embodiments including a keypad 318, the keypad can include (or cause display of) the conventional numeric (0-9) and related keys (#, *), and other keys used for operating the mobile device 300 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The mobile device 300 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database mapping systems, data, applications, programs, program modules, scripts, source code, object code, byte code, compiled code, interpreted code, machine code, executable instructions, and/or the like to implement the functions of the mobile device 300.

The mobile device 300 may also include one or more of a camera 326 and a mobile application 330. The camera 326 may be configured according to various embodiments as an additional and/or alternative data collection feature, whereby one or more items may be read, stored, and/or transmitted by the mobile device 300 via the camera. The mobile application 330 may further provide a feature via which various tasks may be performed with the mobile device 300. Various configurations may be provided, as may be desirable for one or more users of the mobile device 300 and the system 20 as a whole.

Inquiry Functionality

Various embodiments are configured to obtain data indicative of various user attributes for a population of mobile device users. For example, various embodiments may obtain data indicative of various user purchase habits, user preferences, and/or the like. Such data may be collected and associated with location data indicative of the location of the user device when the data is collected, or it may be collected independently of the location of the user device. In various embodiments, the data indicative of various user attributes may be obtained by a central server 200 providing an inquiry to users of a software program managed and/or otherwise operated by an interface server 800. However, in various embodiments, the central server 200 and the interface server 800 may be functionally related such that a single server provides the functionality of both the central server 200 and the interface server 800.

Various embodiments of the present invention may be used to collect data indicative of the population density of a particular subset of a population. For example, various embodiments of the present invention may be utilized to determine a population density of individuals having a particular interest, performing a particular action (e.g., purchasing a song using a particular computer software program), providing a particular response, and/or the like. Such methods may comprise steps for generating one or more inquiries to be provided to a plurality of user devices (e.g., distributed computer devices 120 and/or mobile devices 300), obtaining response data from each of the plurality of user devices generated based at least in part on user input from the users of each of the plurality of user devices, obtaining location data and/or other identifying data from each of the plurality of user devices, transmitting the collected data from each of the plurality of user devices, and analyzing the collected data to generate data indicative of a population density representative of a number of individuals responding to the inquiry in a particular way.

1. Generating Inquiries

In various embodiments, one or more inquiries may be generated by the central server 200 and provided (directly and/or indirectly) to one or more user devices (e.g., distributed computer devices 120 and/or mobile devices 300). Such inquiries may be generated in response to a request for an inquiry received from, for example, the interface server 800 defining questions and answer choices to be provided to users via user devices, and/or defining device user actions to be analyzed (e.g., the purchase of a song or downloading of a computer program for use on a user device). The request for an inquiry may be generated automatically and/or in response to user input (e.g., to the interface server 800 and/or the central server 200). Each of the one or more inquiries is associated with inquiry data indicative of (1) the question to be asked via the inquiry, (2) one or more answer choices to be provided via the inquiry, (3) graphical objects and/or pop-up notifications to be associated with the one or more answer choices, (4) identifying data to be collected and associated with a user response to the inquiry, (5) a triggering event to be associated with the inquiry, and/or the like. In various embodiments, an inquiry may comprise one or more predetermined answer choices, or it may be configured to accept one or more user-generated responses (e.g., user generated text input via a keyboard, a user generated sketch input via an input device, and/or the like). As a non-limiting example, the inquiry data may indicate that the question to be asked is "Are you a fan of the Yellow Plum?" and may define the answer choices to be provided to a user to be "Yes," "No," and "Prefer not to answer." Additionally, the inquiry data may indicate that the inquiry is to be provided to the user upon the happening of a particular trigger event (e.g., the user opening a particular computer program, the user providing a particular response to another inquiry, and/or the like). Moreover, the inquiry data may indicate that additional identifier data may be collected and associated with the user response. Such identifier data may comprise identifying data indicative of the type of user device used (e.g., the type of mobile device 300 used), the operating system on the user device, the gender of the user, the age of the user, and/or the like.

In various embodiments, the inquiry may be generated to comply with data access permissions and/or restrictions defining the type of data that may be collected from various mobile devices 300. Such access permissions and/or restrictions may be established by the interface server 800, the mobile device 300, and/or other entities. For example, the mobile device 300 may be configured to accept user input provided by a user defining one or more data access permissions and/or restrictions. As a specific example, a user may provide user input to the mobile device 300 specifying that the mobile device 300 should not permit computer programs to access particular data types, such as the user's list of contacts (e.g., names, phone numbers, addresses, and/or the like for other individuals). In various embodiments, the inquiry may comprise an executable portion configured to modify the portion of the inquiry data defining the type of data to be obtained from the mobile device 300 upon a determination that the requested data exceeds the data access permissions and/or restrictions applicable to the mobile device 300. For example, data access permissions and/or restrictions may prevent a particular software program from accessing data indicative of the serial number of the mobile device, the mobile device user's contact list, the mobile device's current location, and/or the like. Such data access permissions and/or restrictions may be specific to a software application managed and/or operated by the interface server 800, and/or the data access permissions and/or restrictions may be universal such that the data access permissions and/or restrictions apply against all software applications. In various embodiments, the executable portion of the inquiry data configured to self-modify the portion of the inquiry data defining the data to be obtained from the mobile device 300 may be transmitted with the inquiry data to the mobile device 300, such that the inquiry may self-modify while stored on the mobile device 300. Because each mobile device 300 may have different data access permissions and/or restrictions, the inquiry may be configured to ensure that the requested data satisfies the data access permissions and/or restrictions specific to each individual mobile device 300.

As discussed herein, the inquiry may be configured to be displayed to a user via a pop-up style notification displayed via the display device of a mobile device 300. In various embodiments, the pop-up style notification may be displayed as a portion of a computer program being accessed by a user (e.g., displayed only while the computer program is active on the mobile device 300) and/or may be displayed as a stand-alone notification displayed regardless of whether any individual program is active on the mobile device 300. In various embodiments, the pop-up style notification may display one or more textual elements, such as the text of a question associated with the notification, as well as text associated with various answer choices associated with the inquiry.

In various embodiments, text-based notifications need not be displayed in order to obtain data regarding a device user. In such embodiments, a text-based inquiry (e.g., a question) need not be displayed to the user, and existing elements of a particular graphical display may correspond to one or more answer choices. For example, an inquiry may concern the number of times a song is purchased in a particular program (e.g., by a plurality of users), and a particular response option may be selected upon a user selecting a graphical display object corresponding to a decision to purchase the song (e.g., an indicated "purchase" button displayed as a part of a computer program; an advertisement displayed as a part of a computer program; movement of a graphical object to a particular designated area on a graphical display; and/or the like). Following the above example, upon the user selecting the "purchase" button for a particular song, the inquiry data may cause the mobile device to compile and transmit additional user attribute data (e.g., indicative of the mobile device type, the age of the user, the gender of the user, the location of the user, and/or the like) to be provided to an interface server associated with online music purchase store as response data. Therefore, data regarding the number of individuals who purchase a particular song, and their location, may be determined without requiring any additional action or user input to be provided by the user of a user device.

The inquiries may be generated by a central server 200 or a distributed computing device and stored in one or more databases to be transmitted to one or more user devices 300 (either directly and/or indirectly) upon the happening of the defined trigger events.

Figure 4:
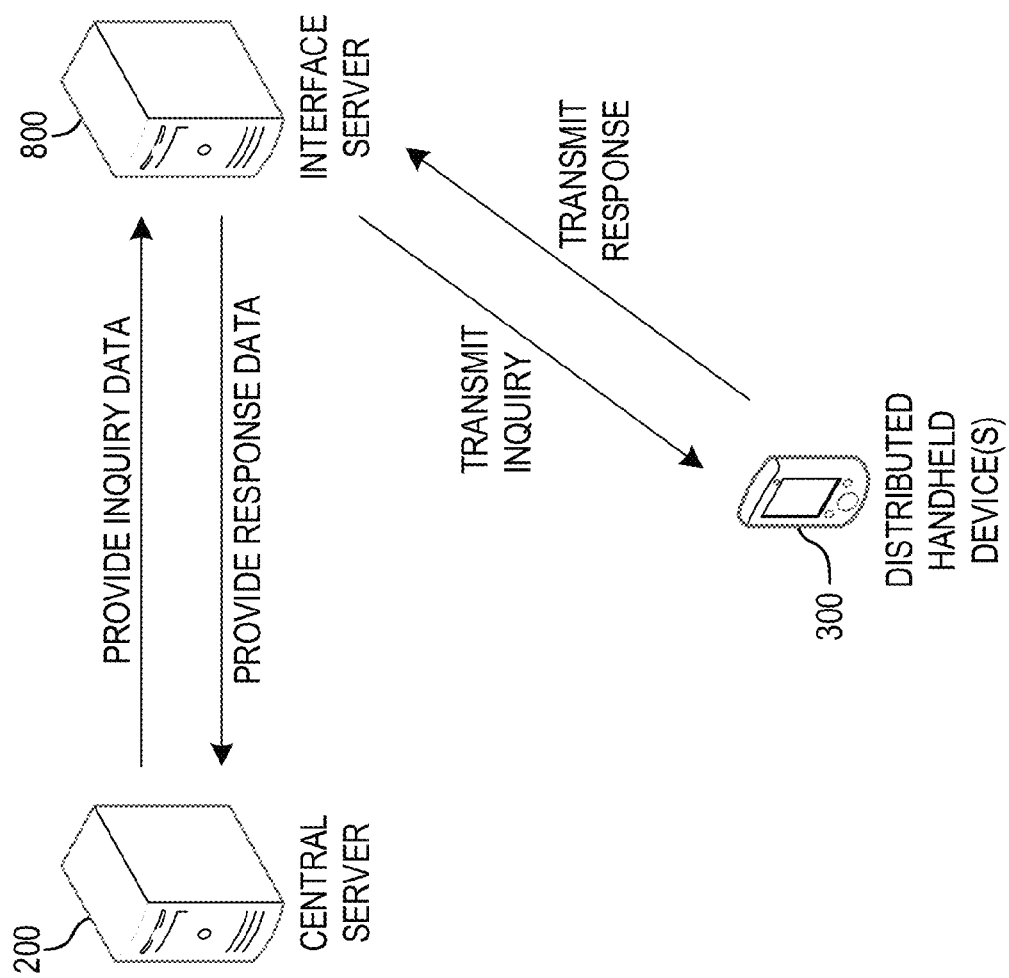
FIG. 4 is a schematic diagram showing data flow directions according to various embodiments.

FIG. 4 provides an illustration of an example flow of data between various components of the system 20. In various embodiments, upon generation of an inquiry, the central server 200 may be configured to transmit the inquiry to the interface server 800 (e.g., via an API). In various embodiments, the central server 200 may be configured to format the inquiry data to fit a required format of the API of the interface server 800, and accordingly the central server 200 may be configured to determine an appropriate format for the inquiry data based at least in part on a review of the API provided by the interface server 800.

As shown in FIG. 4, after receipt of the inquiry data from the central server 200, the interface server 800 may be configured to transmit the inquiry data to one or more mobile devices 300. In various embodiments, the interface server 800 may be configured to transmit the inquiry data upon the occurrence of one or more trigger events, such as the user entering a particular geographical region, the user opening the software program associated with the interface server 800, the happening of a particular time (e.g., 5:00 PM), and/or the like. In various embodiments, the interface server 800 may be configured to transmit the inquiry data upon the occurrence of a plurality of trigger events. For example, the interface server 800 may be configured to transmit the inquiry data upon a determination that (1) the mobile device 300 is within a defined geographical area, and (2) a particular computer program is active on the mobile device 300. In such configurations in which the inquiry data is transmitted upon the occurrence of a plurality of defined trigger events, the inquiry data may be transmitted if and when all of the defined trigger events are satisfied. In various embodiments in which a plurality of trigger events are satisfied before the inquiry data 800 is transmitted, the interface server 800 may be configured to transmit the inquiry data 800 if all of the trigger events are satisfied simultaneously. In certain embodiments, the interface server 800 may be configured to transmit the inquiry data 800 after all of the trigger events are satisfied, even if all of the trigger events are not satisfied simultaneously. In certain embodiments, once the mobile device 300 receives the inquiry data, the mobile device 300 may be configured to display the inquiry to the user. However, in certain embodiments, the interface server 800 may transmit the inquiry data to the mobile device 300 such that the inquiry data is stored locally on the mobile device 300 to await the occurrence of one or more trigger events. In such embodiments, upon the occurrence of the one or more trigger events, the mobile device 300 executes the inquiry such that the inquiry is displayed to the user. As discussed above in reference to embodiments in which the inquiry data is transmitted upon the occurrence of one or more trigger events, in various embodiments, the mobile device 300 may be configured to execute the inquiry upon the occurrence of a plurality of trigger events (e.g., simultaneously, consecutively, and/or the like).

As will be discussed in later detail herein, upon the user providing a response to the inquiry, the mobile device 300 transmits the response data to the interface server 800. In various embodiments, the response data is provided to the interface server 800 along the same communications channel that the inquiry data was initially transmitted to the mobile device 300. Upon receipt of the response data, the interface server 800 is configured to format the response data to comply with an API to transmit data to the central server 200. Moreover, in various embodiments, the interface server 800 may be configured to modify the response data to incorporate supplemental data generated by the interface server 800. For example, the supplemental data may provide additional data regarding the user of a mobile device that is retrieved from publicly available sources and/or databases in communication with the interface server 800. For example, upon receipt of response data identifying a particular mobile device user, the interface server 800 may be configured to retrieve additional data stored in a user profile corresponding to the mobile device user. Accordingly, the interface server 800 may be configured to query one or more databases in communication with the interface server 800 and/or publicly available sources (e.g., a publicly accessible database) based at least in part on the received response data to identify supplemental data to be added to the response data.

In various embodiments, the interface server 800 may be configured to transmit the response data in real time upon receipt of the response data from each mobile device 300, upon receipt of the supplemental data, and/or the like. However, the interface server 800 may be configured to transmit response data from one or more mobile devices periodically (e.g., every 5 minutes, every hour, every 2 hours, every day, and/or the like) and/or upon the happening of a trigger event (e.g., receipt of response data from a threshold number of mobile devices 300). In various embodiments, the response data may be provided to the central server 200 via the same communication channel that the inquiry data was initially provided to the interface server 800.

2. Push Notifications

As previously indicated, various inquiries may be presented to users of a user device via one or more push notifications. Such push notifications may be configured to display a "pop-up" style graphical object on a user device in front of any other content being shown on the user device. In various embodiments, when such push notifications are displayed, a user may be required to interact with the push notification before the user is able to interact with other graphical objects and/or other displays shown on the user device display. As a non-limiting example, if a user of a mobile device 300 selects a particular game to run on the device, and a push notification asking the user "are you a fan of the Yellow Plum?" is displayed on the device, the user may be required to select one of several provided response options before the user is able to interact with the selected game. Therefore, when a user is interacting with the mobile device 300 when the push notification is received and/or displayed, the push notification may prevent the user from accessing other features of the mobile device 300 until the user provides a response to the push notification. In various embodiments, the presence of such push notifications may be indicated to a user of the user device by displaying one or more icons, banners, and/or the like, by illuminating an indicator light, by causing the user device to vibrate, by generating an audible tone, and/or the like.

If the user device is not being used when the push notification is received and/or displayed, an indicator may be displayed on the user device display indicating the presence of the push notification. Such indicator may be visible to the user when the user resumes use of the user device. In various embodiments, the presence of such push notifications may be indicated to a user of the user device by displaying one or more icons, banners, and/or the like that will be visible to the user when the user resumes use of the user device, by illuminating an indicator light, by causing the user device to vibrate, by generating an audible tone, and/or the like.

3. Location Independent Inquiries

In various embodiments, location-independent inquiries may be transmitted to one or more user devices and displayed to the device user via a display. Such location-independent inquiries may concern subject matter that is not specific to a particular geographical location, and may be presented to users in any geographical location. As non-limiting examples, such inquiries may concern nationally and/or internationally-distributed products, national political campaigns, entertainment content (e.g., musical preferences, television preferences, movie preferences, and/or the like), user personality (e.g., the favorite color of the user, the user's physical attributes, and/or the like), and/or the like. Moreover, in various embodiments, a location-independent inquiry may comprise one or more coupons (e.g., a discount code) for a particular product and/or service that may be stored in a memory associated with the user device. As a non-limiting example, a location-independent inquiry may ask users "is the left Twix® candy bar or the right Twix® candy bar better?" As yet another non-limiting example, a location-independent inquiry may ask users "would you like to save a coupon for a discounted Twix® candy bar?" Upon a user selecting an affirmative response to such an inquiry, a coupon may be saved to the user device for later access by the user.

Figure 5:
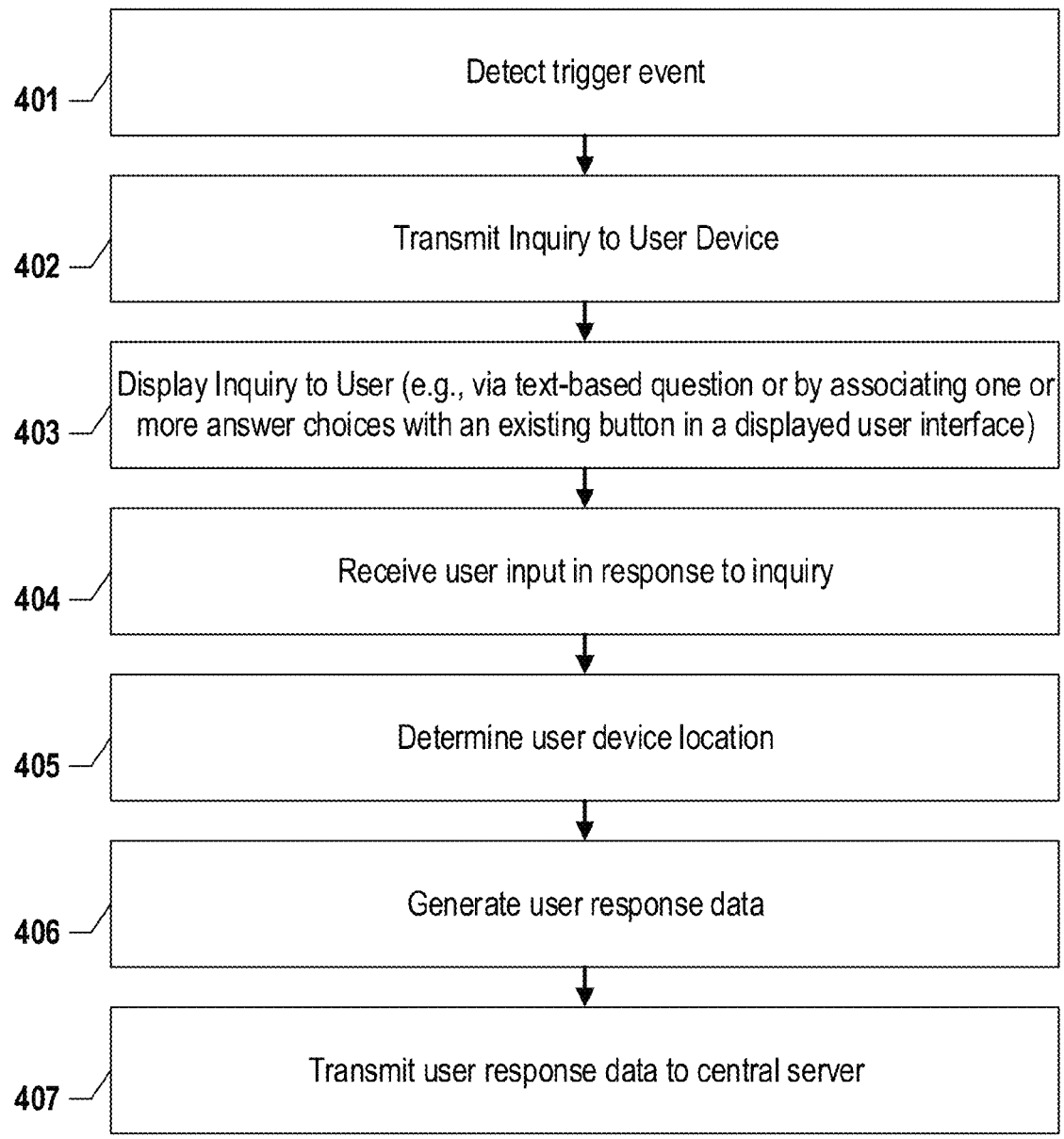
FIG. 5 is a flowchart illustrating various steps for transmitting location independent inquiries, according to various embodiments.

FIG. 5 illustrates a method for transmitting a location-independent inquiry to one or more user devices according to various embodiments of the present invention. As shown in FIG. 5, the method begins at Block 401 at which at least one of the user device (e.g., distributed computer device 120 and/or mobile device 300) and/or the central server 200 detects the occurrence of a trigger event. Upon the occurrence of (e.g., after) a trigger event, the central server 200 transfers an inquiry to a user device at Block 402. In various embodiments, the inquiry is transmitted in response to a trigger event, such as a user opening a particular computer program. Thus, in various embodiments, the central server 200 may receive an indication that the trigger event has occurred, and may transmit the inquiry to the user device in response to receiving such an indication.

As shown in FIG. 5, the inquiry is received by the user device, and is displayed to the user at Block 403. The inquiry may be displayed as a push notification and require the user to provide a response thereto before the user is able to utilize other features of the user device. In various embodiments, an indicator indicative of the receipt of an inquiry may be generated by the user device, and the inquiry may thus require the user to select the inquiry in order to provide a response thereto. In various embodiments, the inquiry may expire upon the happening of an expiration trigger event, such that the user is unable to access the inquiry after it has expired. Example expiration trigger events may comprise the expiration of a period of time, the closing of a particular computer program, disabling the user device, and/or the like.

As previously indicated, the inquiry may be incorporated into an existing graphical display, such that various response options are associated with one or more graphical objects displayed to the user. Thus, in various embodiments, the inquiry need not comprise a text-based question displayed to the user via a notification. For example, a response option may be associated with a "purchase" graphical object (e.g., a button) displayed via a mobile device 300 as a part of a music download and/or streaming computer program. In such an embodiment, upon the user selecting the "purchase" button, data indicative of the user action may be received by the mobile device 300. In such embodiments, the inquiry data may indicate the one or more graphical objects to be associated with inquiry responses. The inquiry data may specifically indicate the identity of the graphical object to be associated with the inquiry response. For example, the inquiry data may specify that the inquiry response is to be associated with a graphical object identified as a "purchase" button (e.g., identified based on computer code for a particular computer program, the interface server 800 and/or the like). As yet another example, the inquiry data may identify a particular location on the graphical display to be associated with the inquiry (e.g., identified in reference to a particular point on a screen, such as the area existing between 50 and 75 pixels to the right of the left edge of a screen and between 10 and 20 pixels below the top edge of the screen). In certain embodiments, the inquiry data may provide a generic indication that the inquiry data may be associated with one or more graphical objects, such that the interface server 800 may provide a specific association between the inquiry response and a particular graphical object.

Referring again to FIG. 5, a user input providing a response to the inquiry may be received by the user device at Block 404. After a response is provided to the inquiry, the user device may determine the location of the user device at Block 405. Location data indicative of the location of the user device may be received from a location determining aspect of the user device, and may be indicative of the location of the user when the user provides a response to the inquiry. The location data may also and/or alternatively be indicative of the location of the user device when the inquiry is received. At Block 406, the user device may generate user response data indicative of the content of the user response and/or the location of the user device.

The user response data comprising the location data and the user response may be transmitted to the inquiry server 800 and/or the central server 200 at Block 407. Upon the central server 200 receiving the user response data (either directly from the mobile device 300 and/or indirectly from the inquiry server 800), the user response data may be stored in one or more databases. As will be described in greater detail herein, user response data received from a plurality of user devices corresponding to a single inquiry may be compiled for later analysis, such as geographical analysis to determine a population density of users providing a particular response to the inquiry.

Moreover, in various embodiments, at least one of the central server 200 and/or the interface server 800 may be configured to provide data to the mobile device 300 in response to receipt of the response data. For example, the interface server 800 may be configured to transmit redeemable data comprising a coupon that may be redeemed at a particular establishment (e.g., a "brick-and-mortar" retail establishment, an event venue, a transportation center, and/or the like). For example, the redeemable data may comprise image data that may be presented to a Point-of-Sale (POS) terminal at a retail establishment, textual data identifying a coupon code that may be redeemable at a retail establishment and/or at an internet-based retail establishment (e.g., by providing the coupon code to a POS terminal, a website checkout page, by emailing the coupon data to an entity to complete a transaction, to provide the coupon data to an entity during a phone conversation to complete a transaction, to provide the coupon data to an entity via an SMS message, and/or the like), data that may be transmitted via Near Field Communication (NFC) (e.g., Bluetooth and/or other near-field communication technologies) to a POS, data comprising a one-dimensional and/or two-dimensional bar code that may be stored in the mobile device 300 and presented to a POS terminal (e.g., as a Passbook data file provided via the Apple® iOS operating system), and/or the like. As yet another example, the interface server 800 may be configured to transmit an executable program to the mobile device 300 to provide a service to the mobile device 300. For example, the interface server 800 may be configured to transmit an executable program to the mobile device 300 configured to connect the mobile device to a secure Wi-Fi network nearby the mobile device 300. Accordingly, the executable program transmitted to the mobile device 300 may be configured to execute locally on the mobile device 300 to provide a service to the mobile device 300 (e.g., connect to a Wi-Fi network, play a video, play a sound, and/or the like).

4. Location Dependent Inquiries

In various embodiments, location dependent inquiries may be transmitted to one or more user devices upon a determination that the user device is located in, or outside of, a particular geographical area. Thus, location dependent inquiries may only be transmitted to user devices located within, or outside of, a particular geographical area. In various embodiments, location-dependent inquiries may comprise one or more coupons (e.g., a discount code) for a particular product or local business that may be stored in a memory of the user device for access by the user at a later time.

As a non-limiting example, such location-dependent inquiries may concern products and/or services that are only available in particular geographical areas, local or regional political campaigns, and/or the like. For example, for a service that is only available to users in Atlanta, Ga. that utilizes a computer program executable by a user device (e.g., a smart phone application executable by a mobile device 300), first content may be provided to users within the Atlanta, Ga. region, and second content may be provided to users outside of the Atlanta, Ga. region. Thus, users within the service area (e.g., the Atlanta, Ga. region) may be granted access to content in the computer program, while users outside of the service area are presented with an inquiry asking "would you like us to provide service in your area?" As another example, users in Georgia may receive an inquiry asking whether the recipients will vote for a particular candidate for Governor of the state of Georgia, while users in Texas may receive a different inquiry asking whether the inquiry recipients will vote for a particular candidate for Governor of the state of Texas.

Figure 6:
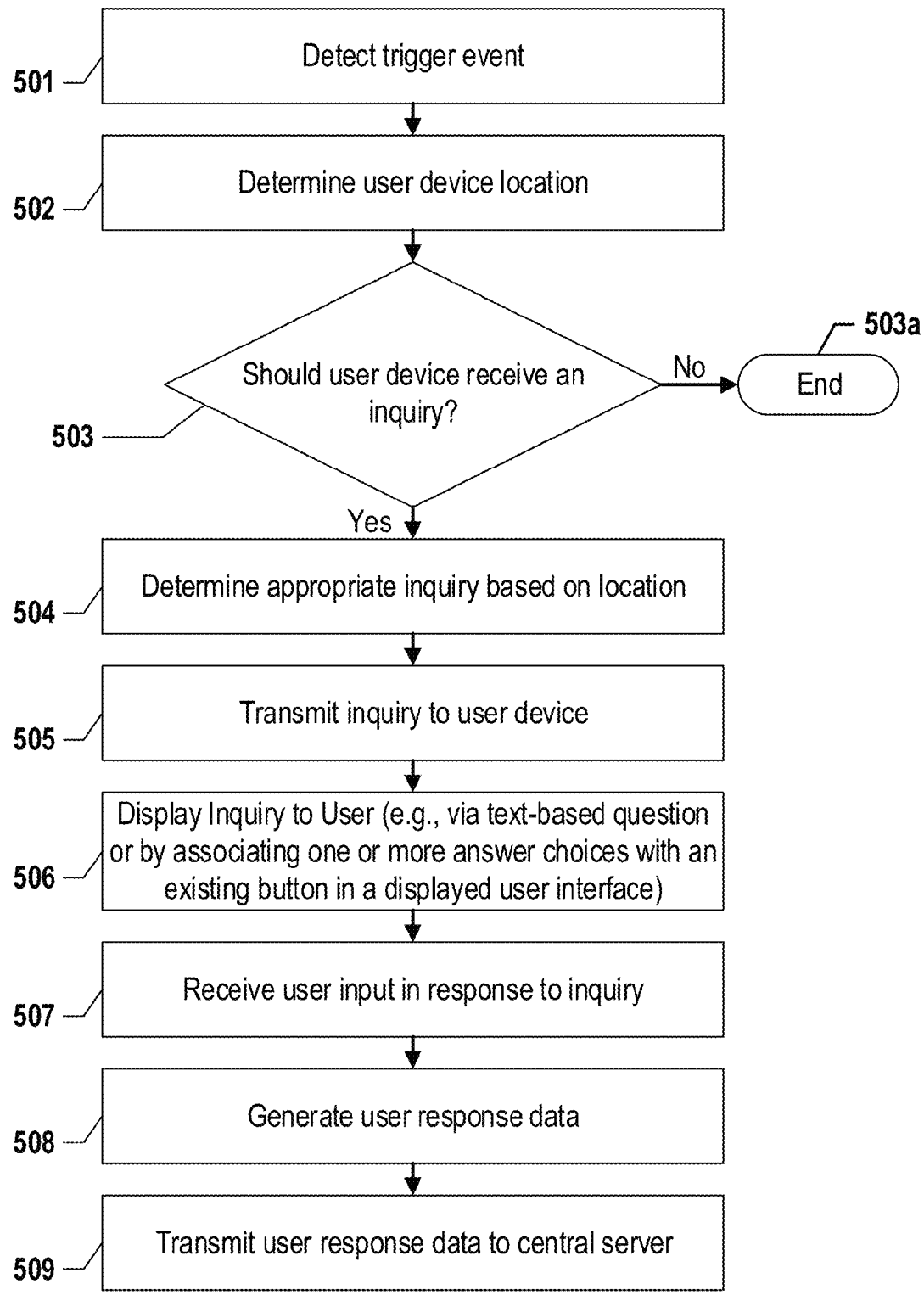
FIG. 6 is a flowchart illustrating various steps for transmitting location dependent inquiries according to various embodiments.

FIG. 6 illustrates an exemplary method of providing location-dependent inquiries to one or more user devices according to various embodiments of the present invention. As illustrated in FIG. 6, the method begins at Block 501 by detecting the occurrence of a trigger event. Upon the occurrence of a trigger event, the location of the user device may be determined by a location determining aspect of the user device at Block 502, and may be provided to the central server 200 in response to receiving a request for the location data. For example, a request to determine the location of the user device may be generated in response to the user selecting a computer program to execute on the user device. Upon receipt of the request to determine the location of the user device, the user device may generate location data indicative of the location of the user device. In various embodiments, the location data may be transmitted to the central server 200. At Block 503, at least one of the user device and the central server 200 may determine whether the user device is located in a particular geographical area defined to receive a particular inquiry.

Upon a determination that the user device is located in a geographical area designated to receive a particular inquiry, the central server 200 may determine an appropriate inquiry to be transmitted to the user device based on the location data at Block 504. In various embodiments, a different inquiry may be designed to be transmitted to user devices located in different geographical areas, and therefore the central server 200 may identify the applicable inquiry to be transmitted to the user device at Block 505.

As shown in FIG. 6, the inquiry is received by the user device, and is displayed to the user at Block 506. The inquiry may be displayed as a push notification, and may require the user to provide a response thereto before the user is able to utilize other features of the user device. In various embodiments, an indicator indicative of the receipt of an inquiry may be generated by the user device, and the inquiry may thus require the user to select the inquiry in order to provide a response thereto. In various embodiments, the inquiry may expire upon the happening of an expiration trigger event, such that the user is unable to access the inquiry after it has expired. Exemplary expiration trigger events may comprise the expiration of a period of time, the closing of a particular computer program, disabling the user device, exiting a geographical area, and/or the like.

In various embodiments, the inquiry may be incorporated into an existing graphical display, such that various response options are associated with one or more graphical objects displayed to the user. Thus, in various embodiments, the inquiry need not comprise a text-based question displayed to the user via a notification. For example, a response option may be associated with a "purchase" graphical object (e.g., a button) displayed via a mobile device 300 as a part of a music download and/or streaming computer program. In such an embodiment, upon the user selecting the "purchase" button, data indicative of the user action may be received by the mobile device. In such embodiments, the inquiry data may indicate the one or more graphical objects to be associated with inquiry responses. The inquiry data may specifically indicate the identity of the graphical object to be associated with the inquiry response. For example, the inquiry data may specify that the inquiry response is to be associated with a graphical object identified as a "purchase" button (e.g., identified based on computer code for a particular computer program, the interface server 800 and/or the like). As yet another example, the inquiry data may identify a particular location on the graphical display to be associated with the inquiry (e.g., identified in reference to a particular point on a screen, such as the area existing between 50 and 75 pixels to the right of the left edge of a screen and between 10 and 20 pixels below the top edge of the screen). In certain embodiments, the inquiry data may provide a generic indication that the inquiry data may be associated with one or more graphical objects, such that the interface server 800 may provide a specific association between the inquiry response and a particular graphical object.

Referring again to FIG. 6, a user input providing a response to the inquiry may be received by the user device at Block 507. After a response is provided to the inquiry, the user device may generate user response data indicative of the content of the user response at Block 508. Such user response data may additionally include location data indicative of the current location of the user. The location data may be received from a location determining aspect of the user device, and may be indicative of the location of the user when the user provides a response to the inquiry. The location data may also and/or alternatively be indicative of the location of the user device when the location of the user device was initially determined prior to transmitting the inquiry to the user device.

The user response data comprising the location data and/or the user response, and/or other data may be transmitted to the central server 200 and/or the inquiry server 800 at Block 509. Upon the central server 200 receiving the user response data, the user response data may be stored in one or more databases. As will be described in greater detail herein, the user response data received from a plurality of user devices corresponding to a single inquiry may be compiled for later analysis, such as geographical analysis to determine a population density of users providing a particular response to the inquiry.

Moreover, in various embodiments, at least one of the central server 200 and/or the interface server 800 may be configured to provide data to the mobile device 300 in response to receipt of the response data. For example, the interface server 800 may be configured to transmit redeemable data comprising a coupon that may be redeemed at a particular retail establishment. For example, the redeemable data may comprise image data that may be presented to a Point-of-Sale (POS) terminal at a retail establishment, textual data identifying a coupon code that may be redeemable at a retail establishment and/or at an internet-based retail establishment, data that may be transmitted via Near Field Communication (NFC) (e.g., Bluetooth and/or other near-field communication technologies) to a POS, data comprising a one-dimensional and/or two-dimensional bar code that may be stored in the mobile device 300 and presented to a POS terminal (e.g., as a Passbook data file provided via the Apple® iOS operating system), and/or the like.

5. Population Analysis

Regardless of whether the received user response data corresponds to a location-independent inquiry or a location-dependent inquiry, the central server 200 may compile received user response data from a plurality of user devices corresponding to a single inquiry, and generate, based on the compiled user response data, population data indicative of various population attributes. For example, the central server may be configured to generate population density data indicative of the population density of user device users giving a particular response to the inquiry.

In various embodiments, the central server 200 may be configured to provide data indicative of various population attributes regardless of the location of various mobile device users. For example, the central server 200 may be configured to generate data identifying a popular song as indicated by all responses, data identifying whether males or females were more likely to respond to the inquiry, and/or the like.

In various embodiments, the population density data may comprise data indicative of the number of user device users providing a particular response to an inquiry in a particular area. For example, the population density may be described in terms of the number of users per unit of area (e.g., $users/_{square\ mile}$). The population density may be calculated for various predefined areas, such as within municipal city limits, state boundaries, country boundaries, neighborhoods, corporate campuses, collegiate campuses, and/or the like. The central server 200 may additionally and/or alternatively receive user input defining a particular region of interest for which a population density may be determined. For example, a user may draw a shape around a region of interest using an input device (e.g., a mouse, stylus, and/or the like). As an additional non-limiting example, a user may select a particular location of interest (e.g., a geo-coordinate, a street address, and/or the like) and a radius of interest around the selected location in order to define a region of interest. The resulting region of interest may be substantially circular around the location of interest. Additionally, user-defined regions of interest may comprise any regular or irregular shape, such as a rectangle, circle, oval, triangle, irregular polygon, and/or the like.

For a particular inquiry, the central server 200 may receive user input comprising one or more response criteria indicating a response of interest, one or more user attributes of interest, and/or a date range of interest. In determining the population density of user device users providing the response of interest to the inquiry within the date range of interest, the central server 200 may identify all those user response data having location data indicating the user device was within the region of interest. The central server 200 may also determine the area of the region of interest (e.g., calculated in square miles), and may calculate an average number of users providing the response of interest to the inquiry per unit of area within the region. In various embodiments, the central server 200 may receive a plurality of response criteria to determine the population density of user device users providing a particular response and meeting one or more additional criteria. For example, such additional criteria may comprise providing a response of interest to a second inquiry, the user being a particular gender, age, income level, and/or the like. As an additional example, the central server 200 may therefore determine a population density of female users between the ages of 18-30 located within a 30 mile radius of a particular location who provide a "Yes" response to the inquiry "Are you a fan of the Yellow Plum?" As illustrated by the above example, a population density may be determined with consideration of several criteria, including users' gender, age, and provided response to a particular inquiry.

In various embodiments, the central server 200 may additionally generate a graphical map display indicating the location of various user devices on a displayed map as determined by the corresponding location data received from each of the plurality of user devices. In various embodiments, the graphical display may indicate a population density of user device users meeting one or more response criteria, such as providing a particular response to the inquiry in a defined area. As a non-limiting example, the graphical display may indicate areas with various population densities using different colors, and/or may provide a numerical value indicating the population density in each of one or more areas.

The population density data may be used for various purposes. For example, for responses to location-dependent inquiries, such information may be used to determine a level of interest in a particular regionally-distributed product or service in areas where the product or service is not currently offered. For example, an entity offering a particular service within the Atlanta, Ga. region may utilize the population density data to determine that a substantial number of user device users in Asheville, N.C. are interested in the service. Such information may facilitate decisions to expand an existing business into new regional markets.

For location-independent inquiries, entities may use the population density data to determine product or marketing preferences to generate effective future marketing materials for each region.

As an additional non-limiting example, the population density data may be monitored over time to determine how the popularity of a particular response to an inquiry changes over time. In such embodiments, the population density data for a particular inquiry response may be determined for a plurality of time periods. Additional exemplary uses are described in Appendix A.

In various embodiments, the central server 200 may be configured to indicate areas meeting one or more user-defined response criteria via a displayed map. For example, the central server 200 may receive a request to show all areas having a minimum population density of users providing a particular response to an inquiry. The central server 200 may thus provide a graphical display of a map indicating all areas having at least the minimum population density of users providing a particular response to an inquiry. As another non-limiting example, the central server 200 may be configured to determine appropriate area boundaries, or it may be configured to define area boundaries based on a user input. Thus, the central server 200 may display all neighborhoods in the Atlanta, Ga. area having a minimum population density of users providing a particular response to an inquiry upon receipt of a user input requesting such information to be divided based on neighborhood boundaries. Moreover, in various embodiments, the central server 200 may be configured to display the areas having the highest population density. For example, the central server 200 may be configured to determine and display the 10 areas having the highest population density of responses to a particular inquiry. As previously indicated, the one or more response criteria may comprise user attributes separate from the response given by a user. Thus, the central server 200 may be configured to display the population density of users meeting all of the response criteria (e.g., all male users between 18-24 years of age using an Apple iPhone® and providing a particular response to an inquiry) in one or more areas.

In various embodiments, the central server 200 may be configured to determine an average rate of response to a particular inquiry for each of a plurality of areas. As a non-limiting example, the central server 200 may be configured to determine that users in Texas are providing responses to a particular inquiry at a first rate (e.g., in responses per hour), while users in Georgia are providing responses to the particular inquiry at a second rate. In such embodiments, the central server 200 may be configured to provide a graphical display indicating the rate of response in various areas to a user.

Exemplary Methods Use

Described herein is an exemplary system, method, and computer program product utilizing the population density determining features described above. In various embodiments, features for determining the population density of users (as used herein "diners" and "users" are used interchangeably) may be implemented as a portion of a restaurant specials system for informing diners of menu changes at restaurants. In various embodiments, the restaurant specials system may be configured to automatically send notifications of menu changes at one or more selected restaurants. The restaurant specials system may be configured to determine the current location of a user device, and to send notifications regarding menu updates for nearby restaurants selected by a user of the user device. Therefore, notifications may only be sent to users in particular areas (e.g., within a predetermined distance away from a participating restaurant). As will be described in greater detail herein, location-dependent inquiries such as those described herein may be transmitted to users of the system outside of the serviced regions, and population density data indicative of the number of users interested in the service may be generated for areas outside of the serviced regions.

In various embodiments, the restaurant specials system may be configured to provide data to various third party systems (e.g., Facebook, Twitter, Yelp, Google, and/or the like) such that users may send data generated by the restaurant specials system to third parties. For example, the restaurant specials system may be configured such that users may "share" a restaurant or dish rating with friends and/or family via a third party system (e.g., Facebook). Moreover, the restaurant specials system may be configured to receive data from one or more third party systems. For example, the restaurant specials system may be configured to utilize data received from Facebook to populate one or more portions of a user profile.

In various embodiments, the restaurant specials system may associate a diner profile with each diner using the system. Each diner may utilize a username and password to access and/or edit data associated with the diner profile. Similarly, a restaurant profile may be associated with each restaurant utilizing the restaurant specials system. Each restaurant may utilize a username and password to access and/or edit data associated with the restaurant profile. In various embodiments, the diner profiles and/or restaurant profiles may be accessed and/or edited using at least one of a specially designed computer program product executing on a user device, and an Internet browser having access to data stored by the central server 200.

In various embodiments, the restaurants specials system may comprise a diner user interface and a restaurant user interface. The diner user interface may provide access to various features of the system available to diners, including various features for modifying the diner profile associated with the diner, searching for restaurants, providing ratings for restaurants and or particular dishes served by restaurants, and/or the like. Moreover, the diner user interface may comprise one or more advertisements, such as banner advertisements, that may be displayed to a diner accessing the system. As non-limiting examples, the advertisements may be configured to display information about nearby restaurants, restaurants sponsoring the system, unrelated products or services, and/or the like. In various embodiments, the diner user interface may be configured such that users can transmit data from the restaurant specials system to various third party systems (e.g., Facebook, Twitter, Yelp, and/or the like). As a non-limiting example, the restaurant specials system may be configured to transmit a restaurant review to a restaurant reviewing system (e.g., Yelp) in response to receiving user input from the user. Moreover, in various embodiments, the diner user interface may be configured such that the restaurant specials system may receive data from various third party systems. As a non-limiting example, the restaurant specials system may be configured to receive user profile data from a third party system (e.g., Facebook) and use this data to populate various portions of a diner profile.

Similarly, the restaurant user interface may provide access to various features of the system available to restaurant users (e.g., restaurant managers, owners, employees, and/or the like). For example, the restaurant user interface may provide access to various features for modifying the restaurant menu (e.g., daily items and/or special items), adding and/or modifying the restaurant location(s), and/or the like. Moreover, the restaurant interface may comprise one or more advertisements, such as banner advertisements, that may be displayed to a restaurant user accessing the system. As non-limiting examples, the advertisements may be configured to display information about various restaurant equipment suppliers, restaurants sponsoring the system, unrelated products or services, and/or the like.

Moreover, in various embodiments, the restaurant user interface may be configured to transmit and/or receive data to and/or from various third party systems (e.g., Yelp, Facebook, Twitter, and/or the like). For example, the restaurant specials system may be configured to transmit messages regarding upcoming restaurant specials via a restaurant Twitter account, and/or via a restaurant Facebook account. Moreover, as yet another non-limiting example, the restaurant specials system may be configured to receive data regarding upcoming restaurant specials from a third party system (e.g., Facebook) and update a restaurant menu based at least in part on the received data.

1. Diner Profile

In various embodiments, a diner profile associated with a user of the restaurant specials system may comprise diner data that may be accessed and/or edited via the diner profile. In various embodiments, the diner data may comprise (1) favorite restaurant data, (2) favorite dish data, (3) meal travel data, (4) meal preference data, (5) notification preference data, and/or the like. The favorite restaurant data may comprise data indicative of one or more selected restaurants about which the diner is interested in receiving updates. The favorite dish data comprises data indicative of one or more selected menu items (e.g., shrimp scampi, filet mignon, portabella-burger, beer) about which the diner is interested in receiving updates. In various embodiments, the favorite dish data comprises data indicative of a minimum dish rating for menu items about which the diner is interested in receiving updates. For example, the favorite dish data may indicate that the user is interested in receiving updates regarding items having a minimum rating of 4.5 out of a possible 5 points. Data indicative of such ratings may be retrieved by the restaurant specials system from third party sources (e.g., Yelp), or it may be stored in a memory storage device corresponding to the restaurant specials system. The meal travel data may comprise data indicative of a region about which the diner is interested in receiving updates. For example, the meal travel data may comprise data indicative of a maximum travel time or distance the diner is willing to travel in order to dine at a restaurant. As an additional example, the meal travel data may comprise one or more regions in which the user is willing to travel to dine. The identified regions in which the user is willing to travel may be selected by user input drawing a border around a map area containing the identified regions, and/or may be set by selecting a particular location of interest (e.g., the diner's current location, the diner's home, or place of business) and a radius extending away from the selected location of interest. In various embodiments, one or more regions of interest may be identified and a subset of the identified regions may be utilized at a particular time. For example, a first subset of identified regions may be utilized during a first identified time period (e.g., Monday-Friday, 8 AM-6 PM), and a second subset of identified regions may be utilized during a second identified time period (e.g., Saturday-Sunday 12:00 AM-11:59 PM). As yet another non-limiting example, a first subset of identified regions may be utilized during those times when the diner is within a specified distance of a first location (e.g., the user is within 25 miles of home), and a second subset of identified regions may be utilized during those times when the diner is within a specified distance of a second location (e.g., the user is within 30 miles of a vacation rental property). Therefore, a particular diner profile may comprise data for a plurality of regions that are selected based on the diner's current and/or expected location.

The meal preference data may comprise data indicative of one or more meals about which the diner is interested in receiving updates. For example, the diner profile may indicate that the diner would only like to receive updates regarding dinner and late-night menus. The notification preference data may comprise data indicative of a diner's preferences regarding frequency, timing, and/or content of notifications. For example, the notification preference data may indicate that a diner prefers dinner notifications be received and displayed on the diner's mobile device 300 at 5:15 PM on Fridays only, and should include information regarding menu updates at the 5 nearest restaurants included in the favorite restaurant data.

The diner profile may comprise additional data associated with the diner. For example, a diner's mobile phone number, home address, email address, gender, cuisine preferences, payment account information (e.g., credit card number), and/or the like may also be associated with a diner profile.

2. Restaurant Profile

In various embodiments, a restaurant profile may comprise data indicative of various attributes of one or more restaurants. In various embodiments, the restaurant profile may comprise (1) restaurant location data, (2) restaurant menu data, (3) special item data, (4) service hour data, and/or the like.

The restaurant location data may comprise data indicative of a street address and/or geolocation of one or more restaurant locations. For restaurants having a single location, or for restaurant establishments having multiple locations each having unique menu offerings, a single restaurant location may be associated with a single restaurant profile. For restaurant establishments having multiple locations having similar menu offerings, a plurality of restaurant locations may be associated with a single restaurant profile.

The restaurant menu data may comprise data indicative of the regular menu offerings of the restaurant. The restaurant menu data may be divided according to meal (e.g., breakfast, lunch, dinner, late-night). The restaurant menu data may comprise data regarding each menu item offered regularly (e.g., daily) by the restaurant.

The restaurant profile may comprise special item data indicative of one or more special items served by the restaurant. In various embodiments, the special item data may be updated manually by a user regularly (e.g., daily), or it may comprise data indicative of special items offered at foreseeable intervals. Thus, for example, the special item data may comprise data indicative of normal weekly and/or monthly specials offered by a restaurant. Moreover, the special item data may define an expiration time for the special. For example, the special item data may indicate that a restaurant is serving a particular special menu item until 11 PM on the current date. In various embodiments, the restaurant specials system may be configured to automatically update the restaurant menu to remove the special menu item upon the defined menu special expiration.

The restaurant profile may additionally include service hour data as well as other data indicative of various attributes of the restaurant. For example, the service hour data may indicate hours of operation for the restaurant for various meals (e.g., lunch served Monday-Friday, 11:00 AM-2:30 PM and dinner served daily, 4:30 PM-11:30 PM). The restaurant profile may also comprise data indicative of discounts and other promotions occurring at the restaurant. Like the special item data, the promotion data may be manually updated by a user regularly (e.g., daily) or it may comprise data indicative of promotions offered at foreseeable intervals (e.g., weekly happy hour on Wednesdays).

In various embodiments, the restaurant profile may comprise notification data indicative of a restaurant's preferences regarding frequency, timing, and/or content of notifications to be sent to users. For example, the notification preference data may indicate that a restaurant prefers dinner notifications be sent to users at 5:15 PM on Fridays only.

3. Exemplary Operation

Figure 7:
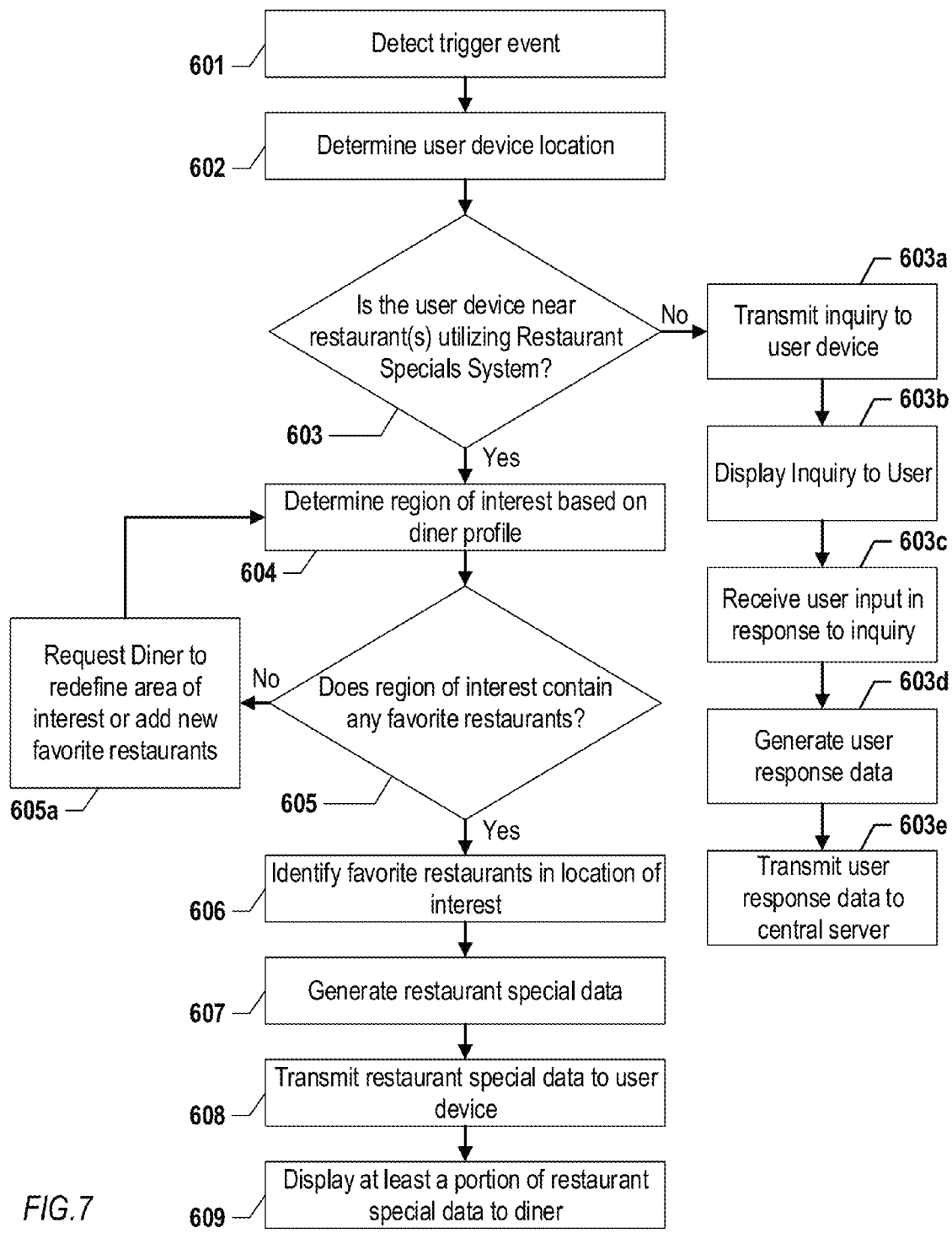
FIG. 7 is a flowchart illustrating various steps for generating and receiving restaurant special data according to various embodiments.

FIG. 7 illustrates exemplary operations of the restaurant specials system. As shown in FIG. 7, in response to (e.g., after) a trigger event is detected at Block 601, a user device determines its location at Block 602. In various embodiments, a trigger event may be the occurrence of a particular time (e.g., 5:00 PM, or a preferred notification time defined in a diner profile and/or a restaurant profile), the opening of a computer program product on the user device, and/or the like. After (e.g., in response to) determining the location of the user device, the system determines whether the user device is near any restaurants utilizing the restaurant specials system at Block 603. Upon a determination that the user device is not near any participating restaurants, the method continues to Block 603a by transmitting a location-dependent inquiry to the user device asking whether the diner is interested in having nearby restaurants utilize the system. In various embodiments, the location-dependent inquiry may be transmitted in response to the occurrence of a trigger event (e.g., the diner opening a computer program operating on a mobile device 300). Similar to the steps described in relation to FIG. 6, the inquiry may be displayed to a user of the user device at step 603b. In response to (e.g., after) a user input being received by the user device at Block 603c, the user device may generate user response data at Block 603d. In various embodiments, the user response data may comprise data indicative of the user response and the user device location when the user response is provided. Moreover, the user response data may comprise data indicative of one or more suggested restaurants for contacting regarding implementing the restaurant specials system in a particular area. For example, upon a determination that no nearby restaurants utilize the restaurant specials system, the user may provide a user response (1) indicating that the user is interested in the service being expanded to cover an area proximate the user's current location, and (2) indicating one or more suggested nearby restaurants to be included in the restaurant specials system.

At Block 603e, the user response data is transmitted to the central server 200. In various embodiments, user response data received from a plurality of user devices may be compiled and utilized to determine a population density of user device users interested in using the restaurant specials system. Moreover, the user response data received from a one or more user devices may be complied and utilized to identify popular restaurants in a particular area that may be contacted in order to expand the number of restaurants included in the restaurant specials system.

Upon receipt of user response data from a plurality of user devices, a population density of interested users may be determined. In various embodiments, the population density of interested users may be utilized to determine appropriate restaurants to solicit regarding use of the restaurant specials system. For example, upon a determination that a large number of potential diners are interested in having restaurants in Asheville, N.C. utilize the restaurant specials system, administrators of the restaurant specials system may contact one or more restaurants in Asheville, N.C. regarding potential use of the restaurant specials system.

Referring again to Block 603 of FIG. 7, upon a determination that the user device is not located near restaurants participating in the restaurant specials system, the restaurant specials system may provide access to one or more features of the system to the user. For example, after transmitting an inquiry to the user device, as described in Block 603a, the restaurant specials system may provide the user with access to features of the system, including access to a map view showing the location of various restaurants participating in the restaurant specials system. In various embodiments, the user device is provided access to all of the features of the restaurant specials system even if the user is not located near a participating restaurant. However, in various embodiments, the restaurant specials system prevents a user from utilizing any of the features of the restaurant specials system, and instead limits the user to receiving and responding to an inquiry, as discussed in reference to Blocks 603a-603e.

Referring again to Block 603, upon a determination that the user device is located near restaurants participating in the restaurant specials system, the method proceeds to Block 604 by determining a region of interest based on a diner profile. For example, as described herein, one or more regions of interest may be defined in the diner profile, and an appropriate region of interest may be identified based at least in part on criteria associated with each region of interest. As previously indicated, the region of interest may comprise a maximum distance away from the user's current location, or it may comprise a particular region to be used at a particular time and/or while a user is within a particular region.

At Block 605 the system determines whether any restaurants listed as favorites in the diner profile are within the region of interest. Upon a determination that no restaurants are listed as favorites in the region of interest, at Block 605a, a notification may be displayed to the user stating that the diner profile must be updated to redefine the region of interest and/or to add restaurants as favorites. The method may return to Block 604 to determine if the region of interest has been updated after displaying the notification to the user.

Upon a determination that favorite restaurants are located in the region of interest, at Block 606 the system identifies those favorite restaurants within the region of interest. However, upon a determination that favorite restaurants are located in the region of interest, the system may be configured to receive user input adding, removing, and/or modifying the favorite restaurants previously identified by the user, and/or modifying the area of interest previously defined by the user.

Referring again to FIG. 7, the method continues at Block 607 by generating restaurant special data for each user device. As indicated herein, the restaurant special data may be indicative of menu changes associated with one or more of the identified favorite restaurants in the region of interest, the addition of one or more favorite menu items at a specified favorite restaurant, and/or one or more restaurants in the region of interest serving an identified favorite dish (e.g., shrimp scampi). Such menu changes may be indicative of special menu items currently offered by each restaurant, changes to the normal (e.g., regular) menu of each of these restaurants, and/or any promotions currently offered by each restaurant. The restaurant special data may be transmitted to the user device at Block 608, and at least a portion of the restaurant special data may be displayed to the user of the user device at Block 609. The displayed portion of the restaurant special data may be displayed via one or more push notifications such as those described herein. In various embodiments, the at least a portion of the special data may be displayed in response to a trigger event such as the occurrence of a preferred notification time (as defined in the diner profile), opening a computer program on the user device, and/or the like.

Figure 8:
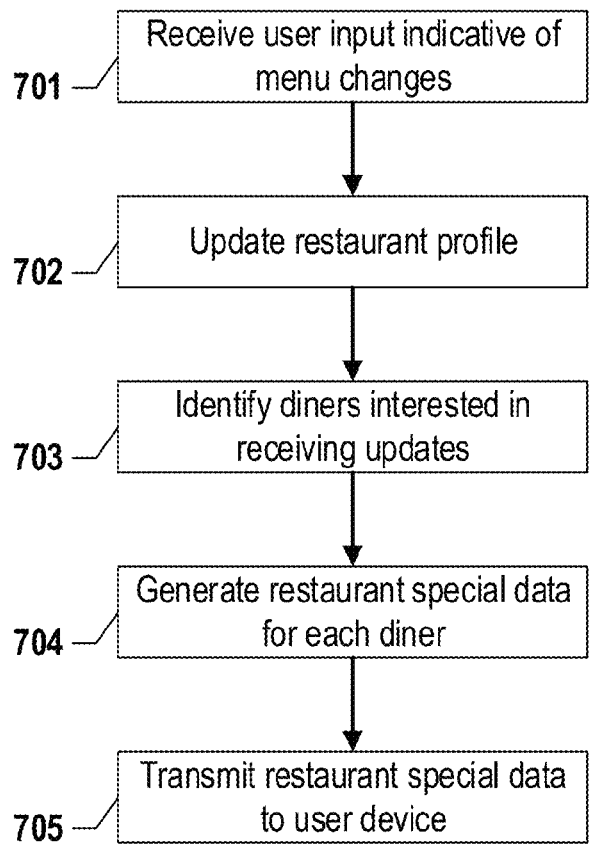
FIG. 8 is a flowchart illustrating various steps for generating and transmitting restaurant special data according to various embodiments.

FIG. 8 illustrates various aspects of the system operation. As illustrated in FIG. 7, the central server 200 receives menu updates from users associated with one or more restaurants at Block 701. Received user input indicative of menu changes (e.g., changes to the normal menu of a restaurant and/or changes due to additions and/or subtractions of special items to the restaurant menu). The user may provide these menu updates via the restaurant profile at Block 702. After receiving menu updates from one or more restaurants, the central server 200 identifies diners interested in receiving updates about each of the restaurants at Block 703. The central server 200 may generate restaurant special data for each of the identified diners at Block 704, and transmit the restaurant special data to user devices associated with each of the diners at Block 705.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computer-implemented method for obtaining data indicative of attributes of mobile device users, the method comprising steps for:

generating inquiry data at a central server, wherein the inquiry data is configured to cause a mobile device to request user input from a user of the mobile device and to compile user attribute data into response data and wherein the user attribute data comprises data indicative of the user input and data stored locally on the mobile device;

transmitting the inquiry data to an interface system, wherein the interface system is configured to communicate with one or more mobile devices and to transmit the inquiry data to one or more mobile devices; and receiving, via the central server, response data generated by one or more mobile devices, wherein the response data is received from the interface system.

2. The method of claim 1, wherein the inquiry data is configured to generate a prompt requesting the user input on a mobile device, and is configured to compile the user attribute data after receipt of user input in response to the prompt.

3. The method of claim 2, wherein the inquiry data comprises an executable portion to be stored on a mobile device, and wherein the executable portion is configured to initiate in response to receipt of user input in response to the prompt.

4. The method of claim 1, wherein the attribute data comprises the location of the mobile device at the time a user provides the requested user input, and wherein the inquiry data is configured to cause the mobile device to determine the location of the mobile device and to store data indicative of the location of the mobile device as a portion of the attribute data.

5. The method of claim 1, wherein the response data received via the central server comprises the response data generated by one or more mobile devices and supplemental data provided by the interface system.

6. The method of claim 1, wherein the interface system is configured to remotely manage one or more software programs operated by one or more mobile devices, and wherein the interface system is configured to transmit the inquiry data to the one or more mobile devices having the one or more software programs stored thereon.

7. The method of claim 1, wherein the interface system is configured to transmit the inquiry data to the one or more mobile devices in response to a trigger event.

8. The method of claim 7, wherein the trigger event is selected from: activation of a software program stored on the mobile device, the occurrence of a time, or a determination that the mobile device is located within a defined geographical area.

9. The method of claim 1, further comprising steps for analyzing the response data generated by the one or more mobile devices to determine a population density of mobile device users based at least in part on a portion of the response data.

10. A computer-implemented method for obtaining data indicative of attributes of mobile device users, the method comprising steps for:

generating inquiry data at a central server;

transmitting the inquiry data to one or more mobile devices, wherein the inquiry data is configured to cause each mobile device to request user input from a user, to determine the location of the mobile device upon receipt of user input, and to compile response data comprising data indicative of the user input, data indicative of the determined location of the mobile device, and data indicative of mobile device attribute data; and receiving response data generated by the one or more mobile devices.

11. The method of claim 10, further comprising steps for analyzing the response data generated by the one or more mobile devices to determine a population density of mobile device users based at least in part on a portion of the response data.

12. The method of claim 10, wherein transmitting the inquiry data comprises transmitting the inquiry data in response to a trigger event.

13. The method of claim 10, wherein the inquiry data is configured to generate a prompt requesting the user input on a mobile device, and to compile the user attribute data after receipt of user input in response to the prompt.

14. The method of claim 13, wherein the inquiry data comprises an executable portion to be stored on a mobile device, and wherein the executable portion is configured to initiate in response to receipt of user input in response to the prompt.

15. A system for obtaining data indicative of attributes of mobile device users, the system comprising:

one or more memory storage areas; and one or more central computer processors collectively configured to:

generate inquiry data, wherein the inquiry data is configured to cause a mobile device to request user input from a user of the mobile device and to compile user attribute data into response data and wherein the user attribute data comprises data indicative of the user input and data stored locally on the mobile device;

transmit the inquiry data to an interface system, wherein the interface system is configured to communicate with one or more mobile devices and to transmit the inquiry data to one or more mobile devices; and receive response data generated by one or more mobile devices, wherein the response data is received from the interface system.

16. The system of claim 15, wherein the processors are further configured to analyze the response data generated by the one or more mobile devices to determine a population density of mobile device users based at least in part on a portion of the response data.

17. The system of claim 15, wherein the inquiry data is configured to generate a prompt requesting the user input on a mobile device, and to compile the user attribute data after receipt of user input in response to the prompt.

18. The system of claim 17, wherein the inquiry data comprises an executable portion to be stored on a mobile device, and wherein the executable portion is configured to initiate in response to receipt of user input in response to the prompt.

19. The system of claim 15, further comprising an interface system, wherein the interface system comprises:

one or more interface memory storage areas; and one or more interface computer processors, wherein the one or more interface computer processors are configured to:

receive the inquiry data transmitted from the central computer processors;

transmit the inquiry data to the one or more mobile devices;

receive the response data generated by the one or more mobile devices; and transmit the response data to the central computer processors.

20. The system of claim 19, wherein the one or more interface computer processors are additionally configured to modify the response data to include supplemental data generated by the one or more interface computer processors prior to transmitting the response data to the central computer processors.

* * * * *